United States Patent
DeLange

(10) Patent No.: US 7,836,153 B1
(45) Date of Patent: Nov. 16, 2010

(54) METHOD AND SYSTEM TO FACILITATE MANAGEMENT OF A DISTRIBUTED NETWORK

(75) Inventor: Mark DeLange, West Hills, CA (US)

(73) Assignee: Occam Networks, Inc., Santa Barbara, CA (US)

( * ) Notice: Subject to any disclaimer, the term of this patent is extended or adjusted under 35 U.S.C. 154(b) by 3452 days.

(21) Appl. No.: 09/632,075

(22) Filed: Aug. 2, 2000

Related U.S. Application Data

(60) Provisional application No. 60/147,829, filed on Aug. 6, 1999.

(51) Int. Cl.
*G06F 13/00* (2006.01)
*H04L 12/66* (2006.01)

(52) U.S. Cl. .................. 709/220; 709/224; 709/228; 370/352; 370/354

(58) Field of Classification Search .......... 709/203, 709/206, 217, 218, 220, 224, 227, 228, 232, 709/226, 248, 230; 370/85.13, 432, 397, 370/352, 237, 353, 401, 354; 705/1, 8; 715/500.1
See application file for complete search history.

(56) References Cited

U.S. PATENT DOCUMENTS

| | | | | |
|---|---|---|---|---|
| 5,623,492 A | * | 4/1997 | Teraslinna | 370/397 |
| 5,742,762 A | * | 4/1998 | Scholl et al. | 709/200 |
| 5,754,172 A | * | 5/1998 | Kubota et al. | 715/500.1 |
| 5,968,176 A | * | 10/1999 | Nessett et al. | 713/201 |
| 6,085,243 A | * | 7/2000 | Fletcher et al. | 709/224 |
| 6,108,782 A | * | 8/2000 | Fletcher et al. | 713/153 |
| 6,370,152 B1 | * | 4/2002 | Schofield et al. | 370/432 |
| 6,421,714 B1 | * | 7/2002 | Rai et al. | 709/217 |
| 6,490,273 B1 | * | 12/2002 | DeNap et al. | 370/352 |
| 6,570,855 B1 | * | 5/2003 | Kung et al. | 370/237 |
| 6,708,207 B1 | * | 3/2004 | Sabelhaus et al. | 709/223 |

* cited by examiner

*Primary Examiner*—Khanh Q Dinh
(74) *Attorney, Agent, or Firm*—Blakely, Sokoloff, Taylor & Zafman LLP

(57) ABSTRACT

A distributed system having improved management characteristics. A management entity is coupled to a plurality of hub nodes in the distributed network. The hub nodes are each associated with a plurality of integrated access devices (IADs). The hub node proxies each of the associated IADs such that from the management entity point of view, the hub node and associated IADs appear to be a single network element. Management requests for the IAD are then handled in the hub node transparently to the management entity.

11 Claims, 6 Drawing Sheets

METHOD AND SYSTEM TO FACILITATE MANAGEMENT OF A DISTRIBUTED NETWORK

(1) RELATED APPLICATION

This application claims priority from co-pending provisional application Ser. No. 60/147,829, filed Aug. 6, 1999.

BACKGROUND (1) Field of the Invention

The invention relates to communications networks. More specifically, the invention relates to management of broadband integrated systems permitting multiple traffic modes on a single physical transport link.

(2) Background

Communication systems have been trending towards systems that permit voice and data traffic to be combined on a single physical transport link at the customer premises. These systems, commonly referred to as digital subscriber lines (DSLs), offer many benefits at a cost of requiring complex equipment to be installed the customer premises. This equipment is referred to herein interchangeably as customer premise equipment (CPE) or an integrated access device (IAD). As the number of IADs installed at customer premises proliferates, the management costs of traditional management approaches become preclusive. This is particularly true since deployment of IADs into residences usually result in network deployments, at least in the tens of thousands of devices, and possibly, even in the millions of devices.

Today, individual access to a high-speed backbone may occur using a Multi-Service Access Platform (MSAP). The MSAP enables service providers to offer multiple services (such as voice and data) over a single access facility. Customers using IAD gain access to the MSAP, which is usually located at a central office. If an individual wants to access the internet through a workstation (or other computer systems), which is a port of a local area network, the person must establish a connection with an internet service provider through the IAD and the MSAP. The connection between a workstation and an internet service provider occurs through an IAD, which acts as a router. An MSAP may be located in the phone company central office as part of the network operations center (NOC).

FIG. 1 is a block diagram of a typical prior art system in which a large number of IADs 110 communicate with a NOC 100. A management application 102 resides on the NOC 100 and is responsible for management of the IADs 110. Typically, the IADs would each be provided with an embedded simple network management protocol (SNMP) agent, thereby rendering the IADs manageable via SNMP. The logistics of such management would typically be left to the service provider. When following this approach, each IAD must have a globally unique internet protocol (IP) address for reachability. As the number of IADs grows arbitrarily large, IP address depletion may occur. Additionally, the NOC must have a direct link to each IAD. This link may be formed as an asynchronous transfer mode (ATM) private virtual circuit (PVC). Unfortunately, this uses network resources to provide management paths to the IADs which negatively affects scalability of the system.

BRIEF SUMMARY OF THE INVENTION

A distributed system having improved management characteristics is disclosed. A management entity is coupled to a plurality of hub nodes in the distributed network. The hub nodes are each associated with a plurality of integrated access devices (IADs). The hub node proxies each of the associated IADs such that from the management entity point of view, the hub node and associated IADs appear to be a single network element. Management requests for the IAD are then handled in the hub node transparently to the management entity.

DETAILED DESCRIPTION

Figure 1:
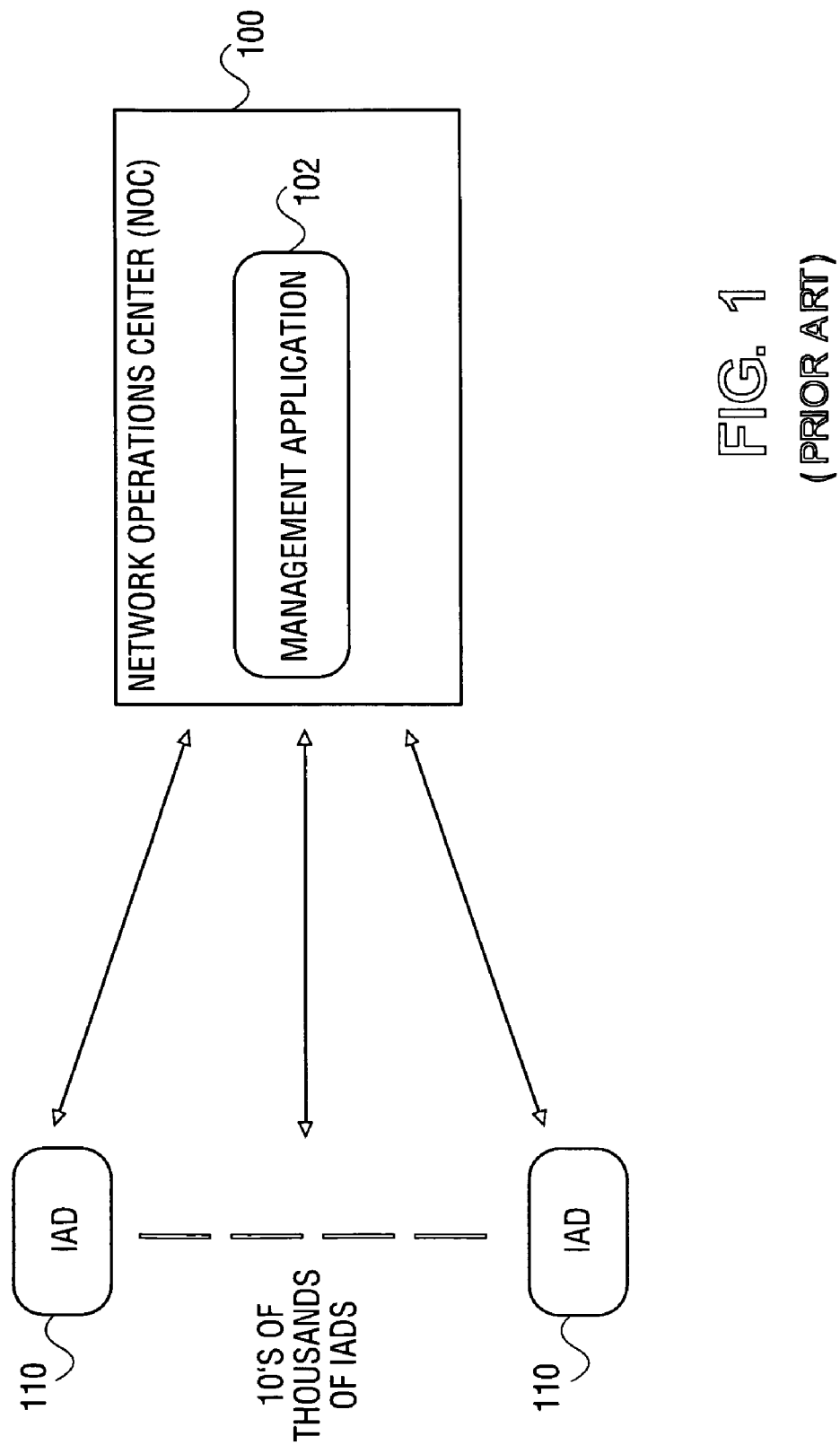
FIG. 1 is a block diagram of a typical prior art system in which a large number of IADs communicate with a network operations center.
Figure 2:
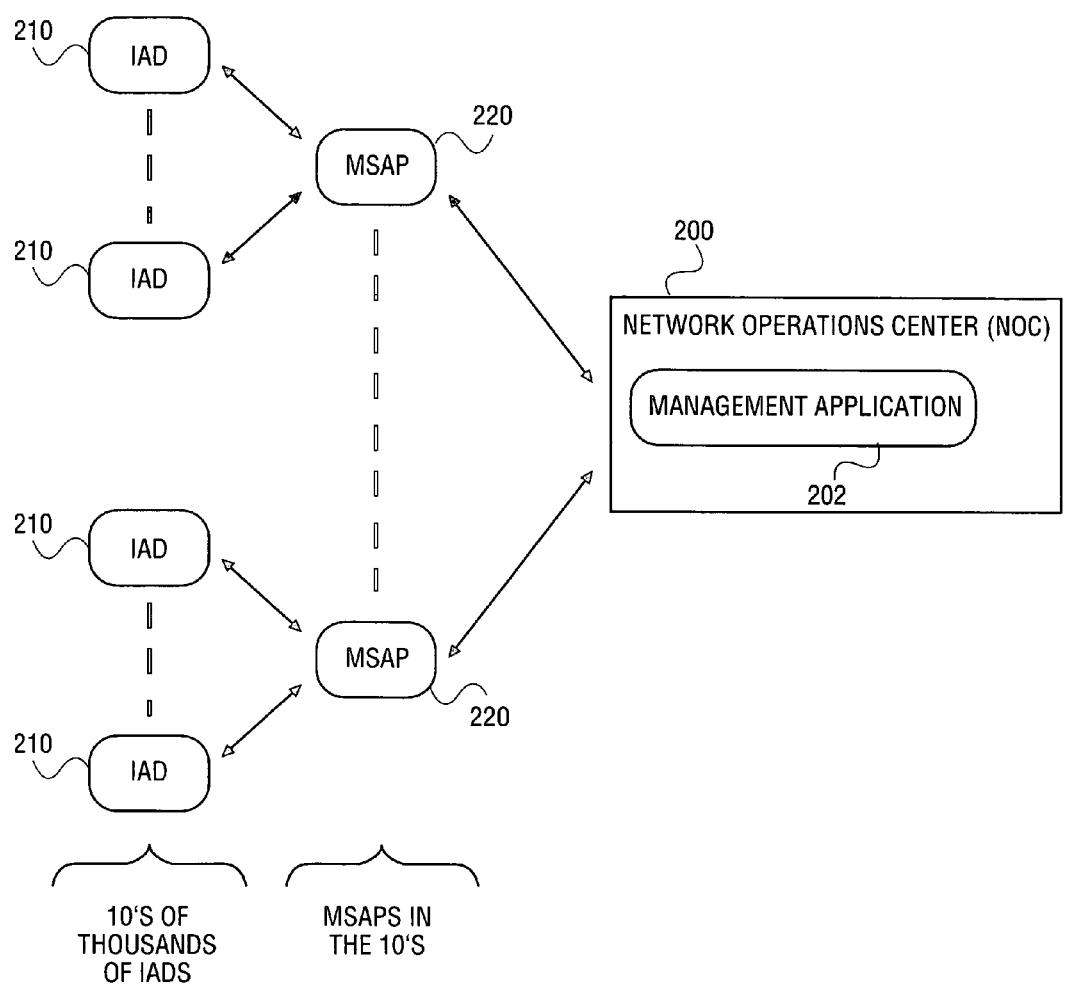
FIG. 2 is a block diagram of a network architecture of one embodiment of the invention.

FIG. 2 is a block diagram of a network architecture of one embodiment of the invention. A network operation center (NOC) 200 having a management application 202 resident thereon is provided. The NOC 200 communicates with multiservice access platforms (MSAPs) 220. The MSAPs, also referred to as hub nodes or central office equipment (COE), typically reside at a service provider's local point of presence (POP). The MSAPs 220 are each coupled to a plurality of integrated access devices (IADs). MSAPs are likely to be geographically removed from both the NOC and the IADs. The number of MSAPs at each POP depends on the expected number of users/IADs and the possible connection density. The MSAPs provide proxy services for a plurality of connected IADs 210. In this manner, each IAD 210 need not be assigned a unique internet protocol (IP) address. Moreover, some complexity is removed from the IAD as it need not have a Simple Network Management Protocol (SNMP) agent embedded. This provides the additional benefit of reduced maintenance travel time as virtually all maintenance can be done either at the NOC or at the MSAP location.

From the NOC point of view, each MSAP 220 (alternatively referred herein as a hub node) appears to contain all attached IADs 210. The NOC manages all attached IADs 210 merely by managing the MSAP 220, as is described in more detail below. In this way, tens of thousands of IADs can be managed using tens of IP addresses corresponding to the tens of MSAPs 220. In one embodiment, 400 IADs may be associated with each MSAP. In such an embodiment, ten thousand IADs would only require twenty-five MSAPs, and correspondingly, only twenty-five IP addresses. Thus, even for very large networks IP address depletion is less of a problem.

Figure 3:
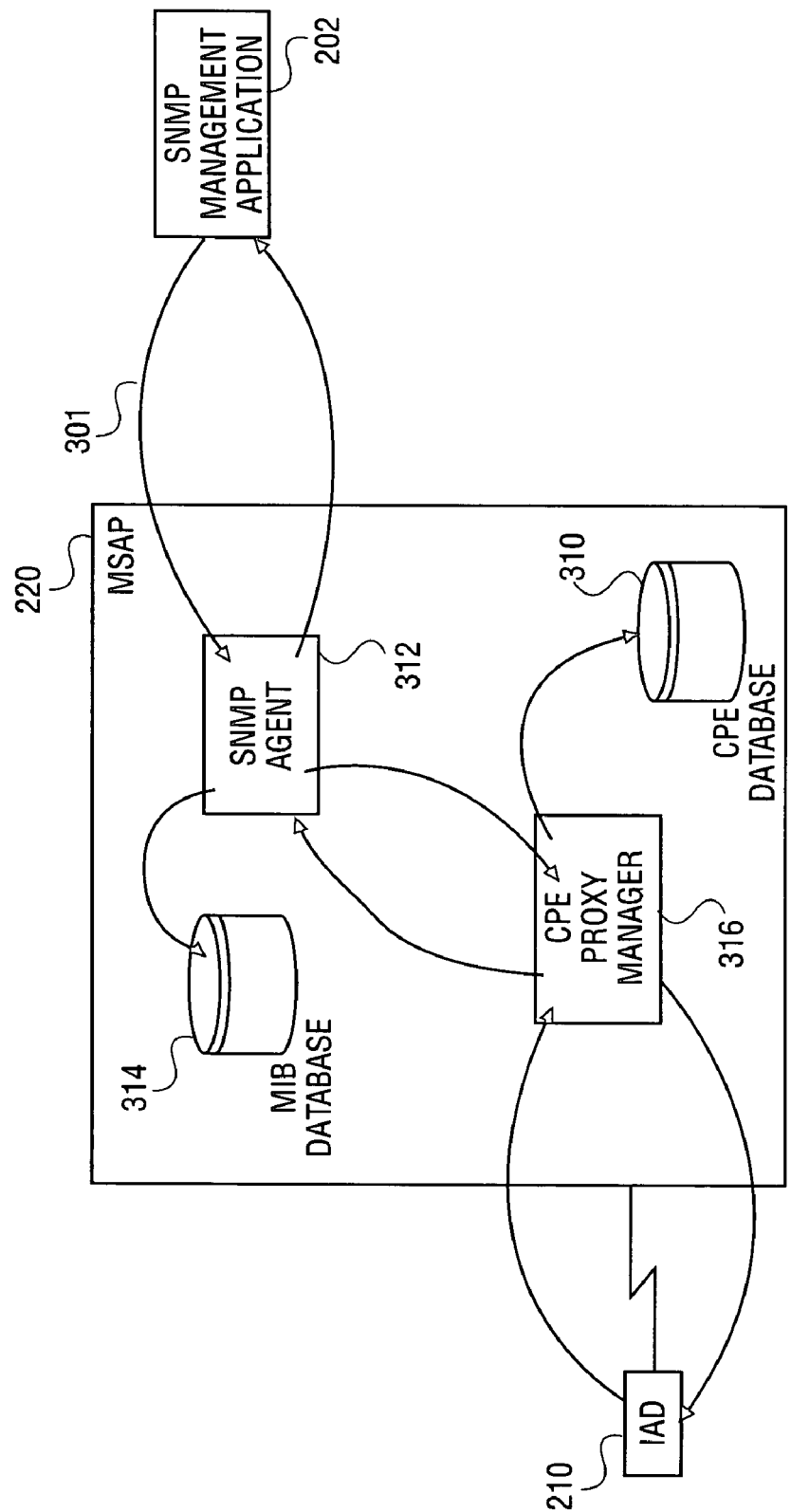
FIG. 3 is a block diagram of communication flow during proxy management of one embodiment of the invention.

FIG. 3 is a block diagram of communication flow during proxy management of one embodiment of the invention. In the shown embodiment, the MSAP 220 contains an embedded SNMP agent to handle management requests from the management application 202. A proxy manager 316 also resides in the MSAP 220. An IAD database is populated with data structures containing status information about the IADs proxied by the MSAP 220. A management information base (MIB) 314 resides on the MSAP 220 and is used to decode incoming management requests. The management request typically arrives as SNMP protocol data units (PDUs). The proxy manager may create and fill those data structures to model all critical IAD sections that need management. Additionally, the proxy manager registers the proxied IADs with the SNMP agent through an MIB definition. As a result, all management requests for objects identified (the proxied IADs) in that definition will be handled by the proxy manager. By using an alternative message structure, the need for an SNMP agent in the IADs is eliminated.

The management application 202 (typically in the NOC) (not shown) sends a request 301 to an SNMP agent 312 in MSAP 220. The SNMP agent 312 accesses the MIB 314 to decode the contents and intended target handlers. The SNMP agent 312 forwards the request to the IAD proxy manager 316 if the MIB 314 indicates that the target is one of the proxied IADs. The proxy manager 316 accesses IAD database 310 to determine the status of the IAD and how the request should be handled.

If the proxy manager is able to respond to the request directly, it forwards a response back to the SNMP agent, which in turn, sends the response out to the management application 202. If the proxy manager 316 is unable to satisfy the request directly, the proxy manager 316 may query the IAD. In that instance, the proxy manager 316 formats the request and sends it to the IAD. Since the IAD has no SNMP agent, an alternative messaging system is employed for communication between the MSAPs and IADs. That messaging system is discussed further below. The IAD is required to respond to all requests from the proxy manager 316 to avoid being designated as unavailable. When the IAD responds, the proxy manager 316 then replies to the original request to the SNMP agent 312, which forwards it out to the SNMP management application 202.

Figure 4:
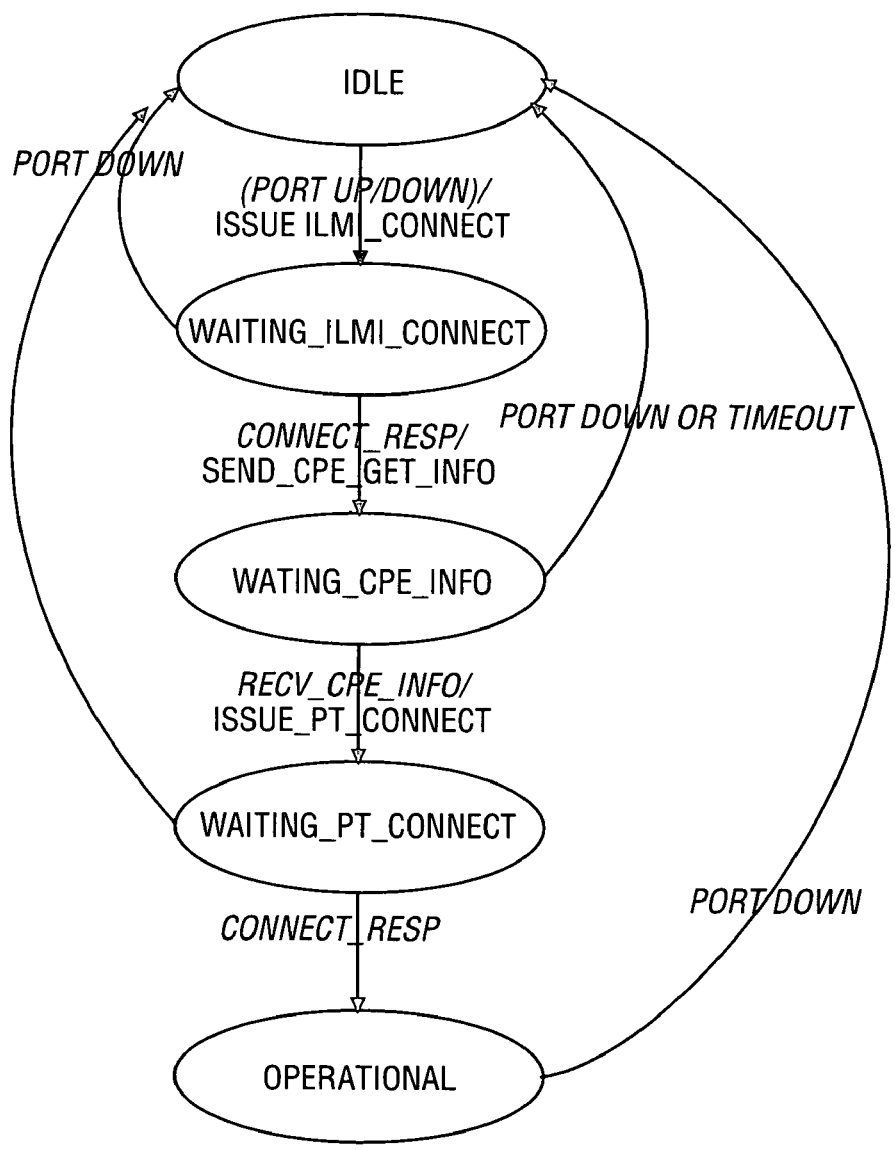
FIG. 4 is a state diagram of execution in the proxy manager in one embodiment of the invention.

FIG. 4 is a state diagram of execution in the proxy manager in one embodiment of the invention. The proxy manager is responsible for maintaining a consistent view of the IADs attached to the MSAP. To that end, the proxy manager may query the IADs periodically and/or the IADs may be required to report status changes to the proxy manager so that it can update the data structures in the IAD database. The state diagram reflects processing performed by the IAD proxy manager which the corresponding IAD is connected is active, it leaves the idle state and issues a connection request. If the connection request is successful, it establishes a private virtual circuit (PVC) path from the port to a peer management entity (PME). PME is the transport mechanism used for message flow between the proxy manager and the IAD. Once that connection is established, the proxy manager sends a get info message to the IAD and transitions into a waiting for IAD info state. If a timeout occurs or the port goes down before the IAD info is received the proxy manager returns to the idle state. Otherwise, upon receipt of the IAD info, the proxy manager issues a port connect command to establish a pass through, e.g., an IP path, between the IAD and the MSAP. Once this connection is established, a normal operational state is reached. From this point on, unless the port goes down, the proxy manager will send a request to the IAD for status changes and for configuration changes, which may be initiated by a user or through an SNMP request from a management station such as the NOC.

Figure 5:
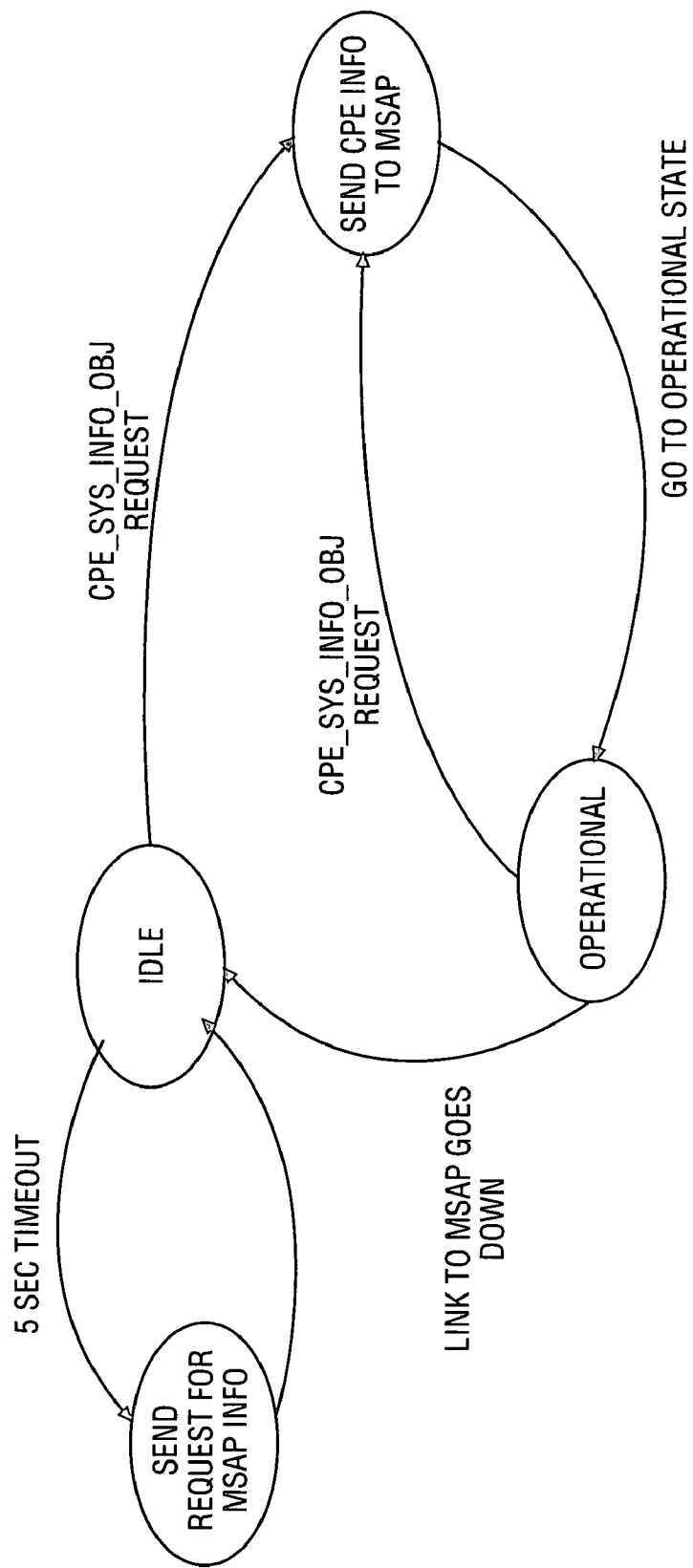
FIG. 5 is a state diagram of operation in the IAD manager.

FIG. 5 is a state diagram of operation in the IAD manager. When the IAD detects that its uplink, e.g., wide-area network (WAN) port, is active, it sends a request to the MSAP for information and it enters the idle state. This request serves as both a notice to the MSAP that the IAD exists and also as a request for information about the MSAP so that an IP data path may be established. If no response is received within a five second timeout limit, the IAD manager transitions back into the request MSAP info state. Otherwise, in response to a request from the MSAP, the IAD manager enters the send information to MSAP state. It then transitions into the operational state. The IAD manager will remain in the operational state until another request is received from the MSAP or the link goes down. Once the link goes down, it returns to the idle state. If a request is received by the IAD, it must respond to the MSAP, otherwise, the IAD may be deemed unavailable or not connected.

Figure 6:
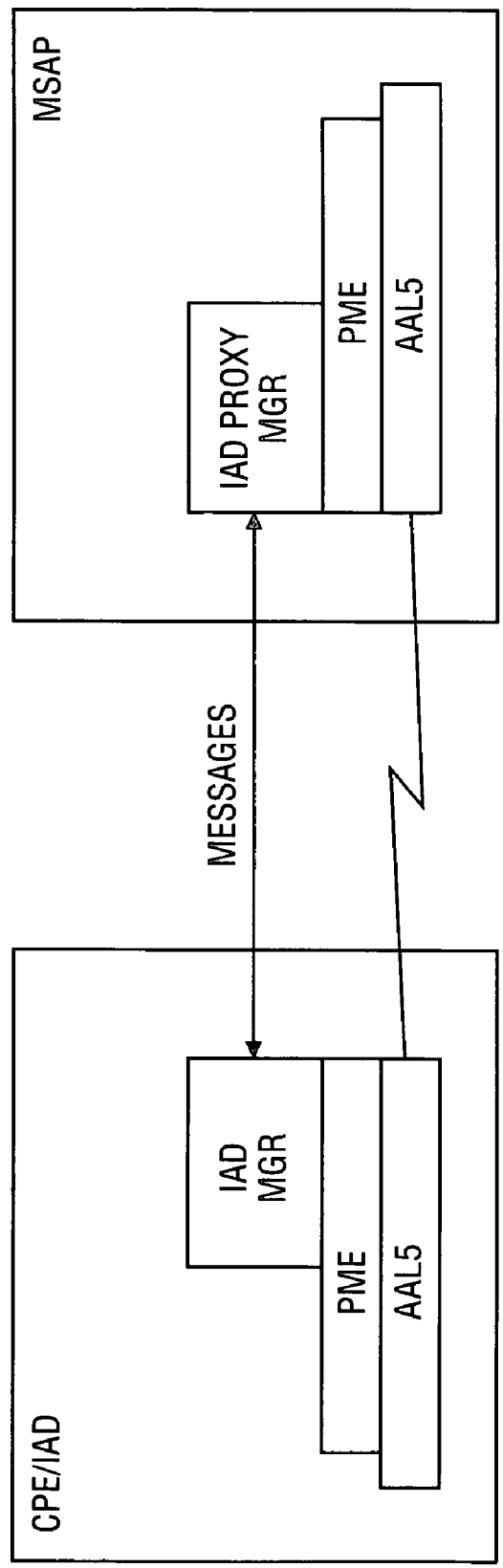
FIG. 6 is a schematic diagram of a message transport system between the MSAP and the IAD.

FIG. 6 is a schematic diagram of a message transport system between the MSAP and the LAD. As shown, messages are passed back and forth between the IAD manager in the IAD and the IAD proxy manager in the MSAP, the transport mechanism is PME, which uses AAL5 as its transport medium. As previously noted, in one embodiment, the messages passed between the MSAP and the IAD are not SNMP messages. One possible message structure is described below.

A PME header precedes the proxy management messages. The format of the PME header is:

| MsgType | MsgId MsgSUid MsgMagicNum DataLen RxSSP | ErrorStatus |
|---|---|---|

MsgId: 4 byte unique identifier for this msg.

MsgType: Can be PME_GET_MSG, PME_SET_MSG, PME_RSP_MSG or PME_ASYNC_MSG. These are defined in pme_defs.h.

MsgSUid: Always equals PME_YB_SUID in our case. Values are defined in pme_defs.h.

MsgMagicNum: Used by PME for message checking. Always initialized to 0xDEADBEEF.

ErrorStatus: Initialized by the module sending PME_RSP_MSG.

DataLen: Length of data that follows the header.

RxSSP: IAD on which the data was received/transmitted.

CPE_SYS_INFO_OBJ

CPE_SYS_INFO_OBJ Request Message (from MSAP to IAD)

This message is sent by the IAD proxy manager after the PME VC becomes active. It is used to gather information from all of the attached IADs which will be managed by the IAD proxy manager. The proxy manager will use the returned information to respond to any internal or external requests for this information on behalf of the IAD. In this instance, internal implies other applications in the MSAP which may need access to the IAD.

| PME header Message type |
|---|

CPE_SYS_INFO_OBJ Response Message (From IAD to MSAP)

This message is sent by the IAD in response to the CPE_SYS_INFO_OBJ message.

```
                    PME header
                    Message type
                    System type
                    PortCount
                    SystemName(40 bytes)
                    CpeSoftwareMajorNumber
                    CpeSoftwareMinorNumber
                    CpeHardwareMajorNumber
                    CpeHardwareMinorNumber
                    cpeOperationalImageFileName(32 bytes)
                    CPE_PORT_INFO(port#1)
                    . . .
                    CPE_PORT_INFO(port#n)
```

The contents of the message are expanded upon below.

CPE_PORT_INFO Format

There will be an entry in the message for each physical port on the IAD. The entry defines the information for each port.

```
                    PME header
                    Message type
    SlotNumber                    portNumber
                    PortType
    Layer#1 Type                  Layer#2 Type
    Layer#3 Type                  Layer#4 Type
```

SystemType: Can be either ANI_AC_30_CPE, ANI_AC_30_CPE. Defined in sys_defs.h.

PortType: Can be either ANI_ETHERNET, ANI_SDSL, ANI_DS1. These values are defined in pm_defs.h.

CPE_SYS_INFO_OBJ

CPE_SYS_INFO_OBJ Request Message (from IAD to MSAP)

This message is sent by an IAD to get the IP address, address mask, and MAC address of the pass through logical port on the MSAP. The information provided by the MSAP is used by the IAD to establish an IP-capable transport path between the CPE and the MSAP. This path is used for additional high-level capabilities, such as downloading files from the MSAP to the IAD. The IP address allocated in this fashion is not exposed to any external entities, such as management applications at the NOC. Because it is not exposed, it need not be globally unique, only locally unique.

```
                    PME header
                    Message type
```

CPE_SYS_INFO_OBJ Response Message (From MSAP to IAD)

```
                    PME header
                    Message type (CPE_SYS_INFO_OBJ)
                    SSP (shelf, slot, port on which CPE is attached)
                    IpAddr (IP address of the passthrough port on MSAP)
                    IpMask (subnet mask of the passthrough port of MSAP)
                    MacAddr (first 4 bytes) - MAC address of the passthrough port on MSAP
                    MacAddr (last 2 bytes)
```

CPE_TIME_OBJ

CPE_TIME_OBJ Async Message (from MSAP to IAD)

This message is used in an asynchronous fashion to send current calendar time to the IAD. This is important to synchronize the various IADs, many of which do not use hardware real time devices. The IAD does not respond to this message, it must just set its local time to that of the contents of the message.

```
                    PME header
                    Message type (CPE_TIME_OBJ)
                    struct timespec (this is the operating system definition format)
```

CPE_PORT_STATUS_OBJ

CPE_PORT_STATUS_OBJ Message (From IAD to MSAP)

This message is sent by an IAD port manager module when it detects any change in port status. It allows the IAD proxy manager to maintain an accurate view of the status of all of the physical ports on the IADs which it manages. It can also use this information to generate other messages to higher level applications if necessary.

```
                    PME header
                    Message type
    PortStatus      CpeSlotNumber      cpePortNumber
```

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   modeling an integrated access device (IAD) within a hub node;
   receiving a management request at the hub node; and
   exchanging messages with the IAD to respond to the request.

2. The method of claim 1 wherein modeling comprises:
   creating a data structure in a database; and
   populating the data structure with status information for the IAD.

3. The method of claim 1 further comprising:
   decoding the management request; and
   routing the request to a proxy manager if the IAD is a target of the request.

4. The method of claim 3 further comprising:
   reformatting the request from a first protocol to a second protocol.

5. The method of claim 2 wherein populating comprises:
   querying the IAD for a current status;
   receiving the current status from the IAD; and
   storing the current status in the data structures.

6. The method of claim 1 further comprising:
   establishing a passthrough link between the IAD and a sender of the request.

7. A system comprising:
a hub node having a global address;
a plurality of integrated access devices (IADs) coupled to the hub node to form a portion of a distributed network, each IAD having the global address; and
a proxy manager residing on the hub node to maintain current status of the IADs.

8. The system of claim 7 wherein the hub node comprises:
an embedded Simple Network Management Protocol (SNMP) agent and a management information base (MIB).

9. The system of claim 8 wherein the IADs do not each have an embedded SNMP agent and wherein the MIB contains a MIB definition that cause the SNMP agent to forward all management requests targeting an IAD to the proxy manager.

10. The system of claim 7 wherein the proxy manager performs protocol translation between an incoming management request and an IAD message request.

11. The system of claim 7 wherein the system is managed externally as a single network element.

* * * * *